Jan. 5, 1932.  L. J. DAVIS  1,840,187
BRAKE ROD
Filed Sept. 12, 1928   2 Sheets-Sheet 1
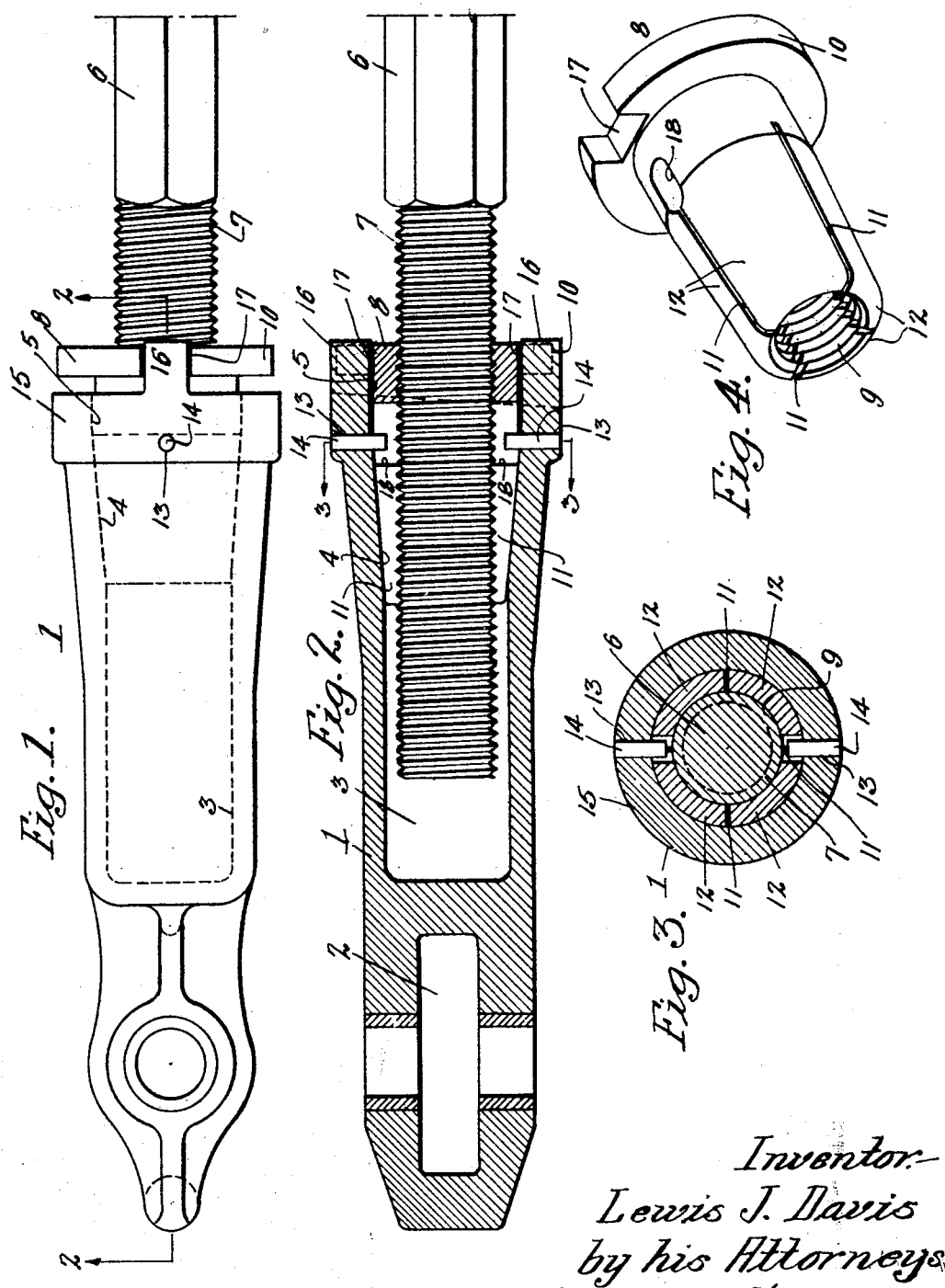
Inventor
Lewis J. Davis
by his Attorneys
Howson & Howson Jan. 5, 1932.   L. J. DAVIS   1,840,187
BRAKE ROD
Filed Sept. 12, 1928   2 Sheets-Sheet 2
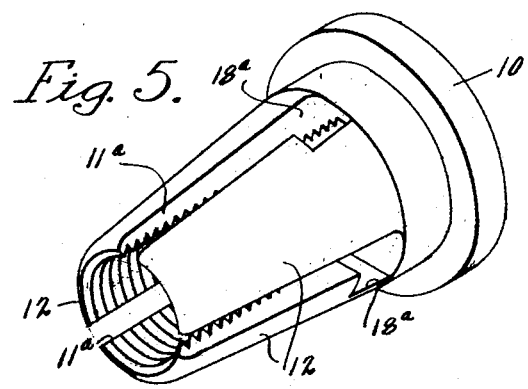
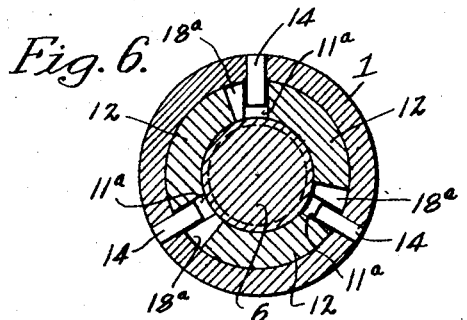
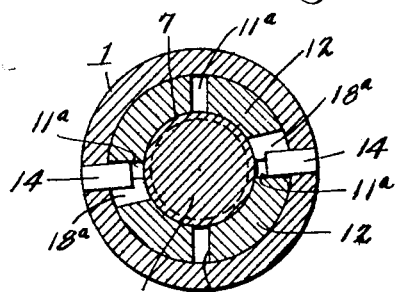
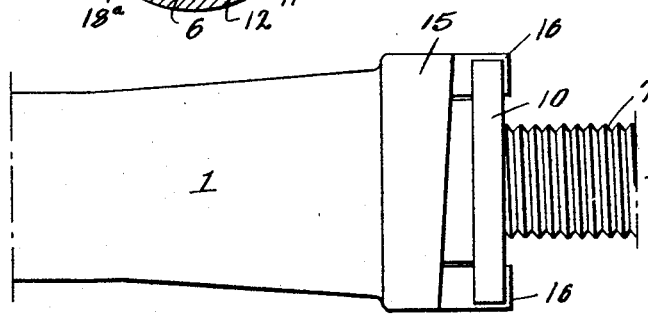
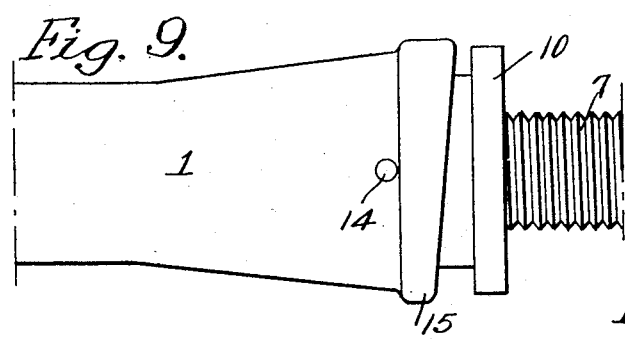
Inventor
Lewis J. Davis
by his Attorneys
Howson & Howson Patented Jan. 5, 1932

1,840,187

UNITED STATES PATENT OFFICE

LEWIS J. DAVIS, OF BROOKLYN, NEW YORK

BRAKE ROD

Application filed September 12, 1928. Serial No. 305,508.

This invention relates to a self-locking turnbuckle or bottom brake rod, and is more particularly concerned with a turnbuckle having a head which tightly engages the adjusting rod upon pressure being applied to the brake lever.

An object of the invention, therefore, is to devise a new and improved form of self-locking turnbuckle.

Another object is to produce a turnbuckle having an adjusting rod around which is threaded a tapered lock-nut which, in turn, engages a suitable head member.

Another object is to produce a device in which the threads of the adjusting member more positively engage the threads of the lock-nut upon actuation of the brake lever.

Still another object is to produce a turnbuckle in which there is positive interlocking between the component elements.

Other objects will appear hereinafter.

In the drawings in which are illustrated several modifications of my invention,

Fig. 1 is a side view of one form of the invention;

Fig. 2 is a sectional view taken on line 2—2 of Fig. 1;

Fig. 3 is a section taken on line 3—3 of Fig. 2;

Fig. 4 is a perspective showing of the locking nut;

Fig. 5 is a perspective showing of a modified form of the lock-nut;

Fig. 6 is a transverse sectional view of the assembled device, employing a head having three pins;

Fig. 7 is a view similar to Fig. 6 but showing a head employing but two pins;

Fig. 8 is a showing of details of one form of the invention, wherein a head has projecting lugs engaging recesses provided in an off-set flange on the locking nut; while Fig. 9 is a view similar to Fig. 8, and shows a head in which no up-standing lugs are employed.

At 1 is shown a head which is connected in any suitable manner as at 2 to a brake lever or the like. The head is internally recessed at 3, for a purpose to be developed later. The recess 3 terminates at its outer end in an outwardly tapered portion 4, of such length as to provide sufficient surface to hold a tapered locking nut in position when it has been pulled or pressed into place. This tapered portion 4 likewise terminates at its outer end in a straight bore 5, of such diameter and length as to provide clearance for the straight cylindrical portion of the tapered locking nut 8.

The adjusting rod is of the usual character and one end only thereof is here illustrated. This rod includes the usual hexagonal portion 6 and threaded portions 7, of which only one is shown. These threads engage nuts 8, which are internally threaded at 9 to cooperate with the threads 7, and as will be understood the threads 9 will be either left-handed or right-handed, as is necessary. Each nut is provided at its outer end with an outwardly extending flange or rim 10, and is preferably longitudinally slotted at 11 to divide the tapered portion into a plurality of tongues 12.

The tapered nuts 8 engage the cooperating tapered portion 4 of the head 1, and receive the rod 6 which is threaded therethrough. The rim 15 of each head 1 is provided with openings 13 through which project pins 14 made of steel or other suitable material. These pins project inwardly to a point which is a greater distance from the longitudinal centre of the recess 3 than the radius of the threaded rod 6.

At its outer end the annular rim 15 of the head is provided at 16 with up-standing lug portions which engage recesses 17 in the flange 10.

When the rod 6 is rotated, the lock-nut 8 is prevented from rotation due to the interlocking action of the pins 14. Inasmuch as the brake lever or the like at 2 prevents the head 1 from rotating, this member acts to securely hold the locking nut in fixed position relative thereto, through the intermediary of pins 14, and thus allows the adjusting rod to be threaded through the nut. A further purpose of pins 14 is to insure that the head is moved along with the locking nut when the adjusting rod is threaded therethrough. In the event that lugs 16 are provided, engaging recesses 17 of the locking nut, these lugs provide the necessary engagement between the head and the locking nut to prevent relative rotation, and in this instance the pins 14 function only to insure that there be only sufficient longitudinal movement between the lock-nut and the head, to allow for wear and inaccuracies of machining.

The short straight bore 3 is merely to provide strength against splitting the walls of the head 1 and by this construction pressure may be applied through the intermediary of the locking nut without increasing the diameter of the head at this point.

The taper of the nut is preferably slightly less than the taper of the bore of the head, the small end of the tapered nut being made perhaps a few thousandths of an inch large, so that when the nut is pressed in place its threads will be pressed deeper into the threads of the adjusting rod adjacent the inner end of the nut where the tongues of the nut are most flexible. This insures that the nut will be tight in the tapered bore of the head adjacent the inner end of the nut, before the nut is tight in the tapered bore at the base of the tongues of the nut.

It will be seen that several of the slots 11 are widened near their closed end to form recesses 18 for the reception of the pins 14.

In Fig. 5 is shown a form of lock-nut having a flange 10 in which the recesses 17 of Fig. 4 are omitted, and which may be provided along its tapered portion with a plurality of slots 11a. These slots terminate at their closed end in recesses 18a which are off-set towards either the right or left for the reception of pins 14, the direction of off-setting depending upon whether the nut is internally provided with left or right-handed threads. As shown in Fig. 6, in such instance the head 1 is provided with a plurality of pins 14.

Fig. 7 illustrates a modified showing of the form shown in Fig. 6, but in which only two of the slots 11a are widened to form recesses 18a, and in which but two pins 14 are provided in the head, to cooperate with said recesses. The widened portions 18a are so located and shaped, that if the nut is loose in the bore of the head 1 and tends to turn with the threaded adjusting rod, the pins in the head will prevent the nut turning in the tapered bore thereof, and the recesses 18a of the slots will move into such position as the nut is screwed on to the adjusting rod that the head will follow the nut, inasmuch as it is held from turning by its connection at 2 on its closed end.

It will be noticed that the annular rim 15 at the open end of the bore of member 1 is not cut off square, but is cut on a bevel above and below the extended lugs. This bevelled cut provides a bearing for a tapered wedge used to draw the nut from the tapered bore of the head. If extended lugs are not provided the bore end of the head is cut off on a bevel clear across the open end, as clearly shown in Fig. 9.

Through this construction a full contact surface between the cooperating threads will be provided for, even though the nut is tapped out too large or the adjusting rod be threaded too small. In the instance that vibration occuring between applications of force to the brake lever is so severe as to loosen the nut in the tapered bore 4, the first time force is applied the nut will be immediately tightened on the adjusting rod and into the tapered bore.

The greater the force applied to the brake lever the tighter the nut will grip the adjusting rod and the tighter the nut will be held in the tapered bore 4 of the head. In this manner the wear on the threads will be very greatly reduced inasmuch as the fit of the threads of the nuts on the threads of the adjusting rod will not be dependent upon extreme accuracy of machining or thread cutting.

It will be seen that in the structure according to this invention the nut can be much more quickly released to permit turning of the adjusting rod than in the instance that lock or jam nuts are employed, inasmuch as it is only necessary to drive a tapered wedge or other suitable releasing means between the flange of the tapered nut and the beveled end of the flange 15 to loosen the nut in the head and to release the nut threads on the threads of the adjusting rod. However, any desired manner of releasing the nut may be employed without departing from the essential features of the invention.

It will be readily understood that this invention is susceptible to numerous modifications and it is intended that it be limited only by the scope of the appended claims.

I claim:

1. In a turnbuckle, an adjusting rod, said adjusting rod terminating in an externally threaded portion, a lock-nut engaging said threaded portion and being provided on its exterior with a tapered portion and a head, and being provided on its head with an outwardly-extending recessed flange, a head for securing said turnbuckle to a load, said last-mentioned head being provided with an internal, tapered bore, co-acting with the tapered portion of said lock-nut, and a rim on said last-mentioned head around the open end of said bore, said rim being provided with lugs for engagement in the recesses in the flange of the lock-nut, the rim being beveled across its outer face.

2. In a turnbuckle, a head for connecting the turnbuckle to a load, said head being provided on its interior with a straight bore closed at one end, and being provided at the open end of said bore with an outwardlytapering bore, said tapered bore terminating at its exterior end in another straight bore, said head being provided at its end adjacent said last-mentioned bore with a rim, said rim having openings extending laterally therethrough and being beveled across its outer face.

LEWIS J. DAVIS.